United States Patent
Raymond

(10) Patent No.: US 9,473,191 B1
(45) Date of Patent: Oct. 18, 2016

(54) PORTABLE HANDHELD CONTAINER

(71) Applicant: Kevin Lee Raymond, Fort Lauderdale, FL (US)

(72) Inventor: Kevin Lee Raymond, Fort Lauderdale, FL (US)

( * ) Notice: Subject to any disclaimer, the term of this patent is extended or adjusted under 35 U.S.C. 154(b) by 0 days.

(21) Appl. No.: 14/839,057

(22) Filed: Aug. 28, 2015

(51) Int. Cl.
| A45C 13/02 | (2006.01) |
| A45C 11/00 | (2006.01) |
| H04B 1/3888 | (2015.01) |
| A45C 13/10 | (2006.01) |
| A45C 13/30 | (2006.01) |

(52) U.S. Cl.
CPC ............. H04B 1/3888 (2013.01); A45C 11/00 (2013.01); A45C 13/02 (2013.01); A45C 13/1069 (2013.01); A45C 13/30 (2013.01); A45C 2011/002 (2013.01); A45C 2200/10 (2013.01)

(58) Field of Classification Search
CPC .. A45C 11/00; A45C 13/02; A45C 13/1069; A45C 13/30; A45C 2011/002; A45C 2200/10; H04B 1/3888
USPC ............ 455/575.1, 575.8; 206/320, 305, 37; 361/679.02, 679.03; 220/529, 532
See application file for complete search history.

(56) References Cited

U.S. PATENT DOCUMENTS

| 1,032,006 A | 7/1912 | Hyde et al. |
| 1,052,010 A | 2/1913 | Neswold et al. |
| 2,469,034 A * | 5/1949 | Garris .................. B65D 47/265 220/532 |
| 2,739,659 A | 3/1956 | Daniels et al. |
| 3,262,013 A | 7/1966 | Allen et al. |
| 3,271,956 A | 9/1966 | Ernest et al. |
| 3,410,947 A | 11/1968 | Behnke et al. |
| 4,393,974 A * | 7/1983 | Levesque ............... A45C 11/00 206/37 |
| 4,420,076 A * | 12/1983 | Beveridge .............. A45C 11/24 206/37 |
| 5,212,015 A | 5/1993 | Mitra et al. |
| 5,272,014 A | 12/1993 | Leyendecker et al. |
| 6,039,173 A * | 3/2000 | Crow ..................... B60R 7/082 206/5 |
| 6,122,014 A | 9/2000 | Panusopone et al. |

(Continued)

FOREIGN PATENT DOCUMENTS

DE 102012109001 A1 6/2014

OTHER PUBLICATIONS

FileMate Joy Series Portable Vibration Speaker, http://www.wintecind.com/features/FileMate/Speakers/P220.html, Jun. 8, 2015.

(Continued)

Primary Examiner — Chun Cheung
(74) Attorney, Agent, or Firm — The Concept Law Group, P.A.; Mark C. Johnson; Yongae Jun

(57) ABSTRACT

A portable handheld container for storing personal items that includes a portable handheld cylindrical sidewall with a first end defining a first opening, a second opposing end defining a second opening, and an inner surface defining a tubular-shaped storage area separating the first end and the second end of the cylindrical sidewall, the container having a first cover portion coupled to the first end so as to enclose the first opening into the tubular-shaped storage area and a second cover portion selectively removably coupled to the second end so as to enclose the second opening into the tubular-shaped storage area, wherein at least one of the first and second cover portions define a plurality of sound propagation apertures and has an inner surface defining a cell-phone track sized and shaped to retain and orient a mobile phone in a longitudinal direction of the cylinder shaped-sidewall within the tubular-shaped storage area.

19 Claims, 7 Drawing Sheets

(56) References Cited

U.S. PATENT DOCUMENTS

| | | | | |
|---|---|---|---|---|
| 6,206,217 | B1* | 3/2001 | Chiang | A45C 7/005 206/37 |
| 6,771,165 | B2 | 8/2004 | Burg II et al. | |
| 7,116,795 | B2 | 10/2006 | Tuason et al. | |
| 7,806,271 | B1 | 10/2010 | Kraska | |
| 8,406,449 | B2 | 3/2013 | Wegener | |
| 8,737,659 | B2 | 5/2014 | Suzuki et al. | |
| 2012/0118769 | A1* | 5/2012 | Conner | A45C 11/00 206/320 |
| 2015/0139464 | A1* | 5/2015 | Guo | H04R 1/02 381/334 |
| 2015/0139465 | A1 | 5/2015 | Yu | |
| 2015/0201050 | A1* | 7/2015 | Yang | H04M 1/0202 455/575.8 |

OTHER PUBLICATIONS

Mai Coffee Cup Portable Speaker by Cyanics, http://www.amazon.com/Coffee-Portable-Speaker-Players-Cyanics/dp/ B0035CWB9I/ref=cm_cr_pr_product_top?ie=UTF8, Jun. 8, 2015.

The Buckshot, minature-size Bluetooth speakers, https://www.iphonelife.com/blog/2886112013s-best-rugged-bluetooth-speakers, Jun. 8, 2015.

Axess SPBT1031 Portable Bluetooth Indoor/Outdoor Hi-Fi Cylinder Loud Speaker with SD Card and USB Input, http://www.sears.com/axess-spbt1031-portable-bluetooth-indoor-outdoor-hi-fi-cylinder/p-00000000000000034457000000000WW-SPBT1031P, Jun. 8, 2015.

Abco Tech Portable Water Resistant Wireless FM Radio Bluetooh Speaker with Hands-Free Speakerphone and Storage, Black, http://www.grenadebump.com/?product=abco-tech-portable-water-resistant-wireless-fm-radio-bluetooth-speaker-with-hands-free-speakerphone-and-storage-black, Jun. 8, 2015.

Jammypack BOOM 21 Waist Bag Jammy Pack Removable Speakers, http://www.ebay.com/itm/Jammypack-Boom-2-1-Waist-Bag-Jammy-Pack-Removable-Speakers-for-MP3-or-Phone-/281115932872, Jun. 8, 2015.

Nozlen Expanding Document Poster Tube, http://www.amazon.com/Nozlen-Expanding-Document-Poster-Inches/dp/B00DGWRHQY/ref=sr_1_cc_2?s=aps&ie=UTF8&qid=1433645650&sr=1-2-catcorr, Jun. 8, 2015.

* cited by examiner

PORTABLE HANDHELD CONTAINER

FIELD OF THE INVENTION

The present invention relates generally to personal carrying containers, and more particularly relates to a cylinder-shaped handheld container for storing personal items.

BACKGROUND OF THE INVENTION

There are a variety of known portable containers used by individuals to carry and transport personal items. Some of these containers include book bags, purses, wallets, and other portable carrying containers. Those known containers fail to provide the user the ability to effectively and safely store the container while the user is engaged in a workout or other exercise routine within a gym or other facility. Said differently, many of those known containers do not provide users with a mechanism to effectively store the container on his or her person while engaged in the workout. As such, the container is typically required to be stored away, which has its own disadvantages such as security and costs. Moreover, in an effort to reduce the opportunities for potential theft, many gyms or exercise facilities have "no bag" policies, which restrict any unsecured bags or containers not capable of being carried by the user or not on the gym floor, from being brought into the gym workout area. Alternatively, the container may be carried by user, but the body of the container or straps/handles will inconvenience or inhibit the user in performing all or some of his or her workout.

Most, if not all, of these containers do not provide a user with the ability to effectively communicate sound waves, generated by a cellular phone or other audio device disposed therein, from the container and into the ambient environment. Those known containers designed for communicating sound waves from an internal cavity of the container to the ambient environment fail to provide for a user to also store other personal items of the user. Moreover, those known containers designed for communicating sound waves from an internal cavity of the container to the ambient environment also fail to provide the user easy and effective access, visibility, protection, and control to the audio device stored within the internal cavity.

Therefore, a need exists to overcome the problems with the prior art as discussed above.

SUMMARY OF THE INVENTION

The invention provides a portable handheld container that overcomes the hereinafore-mentioned disadvantages of the heretofore-known devices and methods of this general type.

With the foregoing and other objects in view, there is provided, in accordance with the invention, a portable handheld container for storing, transporting, and securing personal items that may include a cylindrical sidewall with a first end, a second end defining a second opening, the second end opposite the first end of the cylindrical sidewall, and an inner surface defining a cylindrical storage area separating the first end and the second end of the cylindrical sidewall. The container also includes two cover portions respectively coupled to the first and second ends of the sidewall, wherein at least one of the first and second cover portions define a plurality of sound propagation apertures. The container also includes an inner surface defining a cell-phone track sized and shaped to retain and orient a mobile phone in a longitudinal direction of the cylindrical sidewall within the cylindrical storage area so as to permit the user visibility of the mobile phone and to facilitate in the propagation of the sound waves into the ambient environment.

In accordance with another feature, an embodiment of the present invention include at least one cell-phone track aperture defined by at least one of the first and second cover portions, wherein the at least one cell-phone track aperture is disposed proximal to either the first and second cover portions defining the plurality of sound propagation apertures and spans into the cell-phone track for providing user access to an audio port of the mobile phone retained within the cylindrical storage area.

In accordance with yet another feature, an embodiment of the present invention also includes a door pivotally coupled to the cylindrical sidewall and having an open position along a door translation path at least approximately 70° displaced from an outer surface of the cylindrical sidewall and a closed position with the door attached to the cylindrical sidewall with a hook-and-loop fastener. A transparent window may also be disposed on the cylindrical sidewall (or the door) and is configured to permit user-visibility of and interaction with a front surface of the mobile phone retained within the cylindrical storage area.

In accordance with an additional feature, an embodiment of the present invention also includes at least one magnet disposed on either the cylindrical sidewall and/or the first and second cover portions, wherein the at least one magnet operably configured to produce a magnetic field sufficient to retain, without any external non-magnetic support forces, at least approximately 10% more than a combined weight of the container, defined by the cylindrical sidewall and the first and second cover portions, to a metallic structure.

In accordance with a further feature, an embodiment of the present invention also includes a plurality of magnets disposed on an outer surface of the cylindrical sidewall, wherein the plurality of magnets are operably configured to produce a magnetic field sufficient to retain, without any external non-magnetic support forces, at least approximately 10% more than a combined weight of the container, defined by the cylindrical sidewall and the first and second cover portions, to a metallic structure. One or more of the plurality of magnets may each have an outer surface coplanar with one another.

In accordance with another feature, an embodiment of the present invention also includes the cylindrical sidewall having a plurality of walls disposed on two opposing sides of the inner surface of the cylindrical sidewall, wherein the plurality of walls span, in parallel to one another, from the second end of the cylindrical sidewall toward the first end of the cylindrical sidewall.

In accordance with a further feature of the present invention, the first end of the cylindrical sidewall defines a first opening, the first cover portion coupled to the first end so as to enclose the first opening into the cylindrical storage area and including the inner surface defining the cell-phone track.

In accordance with the present invention, a portable handheld container for storing and securing personal items is disclosed that includes a rigid sidewall with a first end defining a first opening, a second end defining a second opening, the second end opposite the first end of the rigid sidewall, and defines a storage area separating the first end and the second end of the sidewall. The container has a first cover portion selectively removably coupled to the first end so as to enclose the first opening into the storage area and a second cover portion selectively removably coupled to the second end so as to enclose the second opening into the storage area, the rigid sidewall and first and second cover portions defining a container weight. Furthermore, the container has at least one magnet disposed on at least one of the sidewall and the first and second cover portions, the at least one magnet operably configured to produce a magnetic field sufficient to retain, without any external non-magnetic support forces, at least 10% more than the container weight to a metallic structure.

In accordance with another feature, an embodiment of the present invention also includes a plurality of divider walls disposed within the cylindrical storage area and extending along a longitudinal length of the cylindrical storage area, the divider wall segmenting the cylindrical storage area into a first storage area and second storage area.

In accordance with a further feature, the rigid sidewall and the storage area are both of a cylindrical shape, wherein the rigid sidewall is of at least one of a carbon fiber material and a vinyl material.

In accordance with yet another feature, an embodiment of the present invention also includes an inner cover surface defined by the first cover portion, an inner cover surface defined by the second cover portion, and an elastic couple with a first end coupled to the inner cover surface defined by the first cover portion, a second end coupled to the inner cover surface defined by the second cover portion, and, in a static position along an elastic couple translation path, an elastic couple length separating the first and second ends of the elastic couple, wherein the elastic couple length is less than a sidewall length separating the first and second ends of the rigid sidewall.

In accordance with an additional feature, an embodiment of the present invention also includes a retractable strap embedded within at least one of the first and second cover portions, the retractable strap having a free end disposed, in a retracted position along a strap translation path, proximal to the outer surface of the first and second cover portions.

In accordance with the present invention, a container is disclosed that includes a cylinder-shaped sidewall defining a first end, a second end, opposite the first end, and a tubular-shaped storage area between the first end and the second end. The container may also have a first cover portion coupled to the first end so as to enclose a first opening into the tubular-shaped storage area defined by a circumferential edge of the first end, the first cover portion including a flat circular surface sized to cover the first opening, a second cover portion coupled to the second end so as to selectively enclose a second opening into the tubular-shaped storage area defined by a circumferential edge of the second end, the second cover portion including a flat circular surface sized to cover the second opening, and at least one magnet provided on the cylinder-shaped sidewall, the at least one magnet operably configured to magnetically retain the portable handheld container to a metal surface.

In accordance with another feature, the cylinder-shaped sidewall defines a gripping surface extending from the first end to the second end and shaped to be gripped within a palm of a user's hand against the gripping surface without collapsing the cylinder-shaped sidewall.

Although the invention is illustrated and described herein as embodied in a portable handheld container, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the tubular-shaped storage area or from the first end of the container to the second end of the container.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
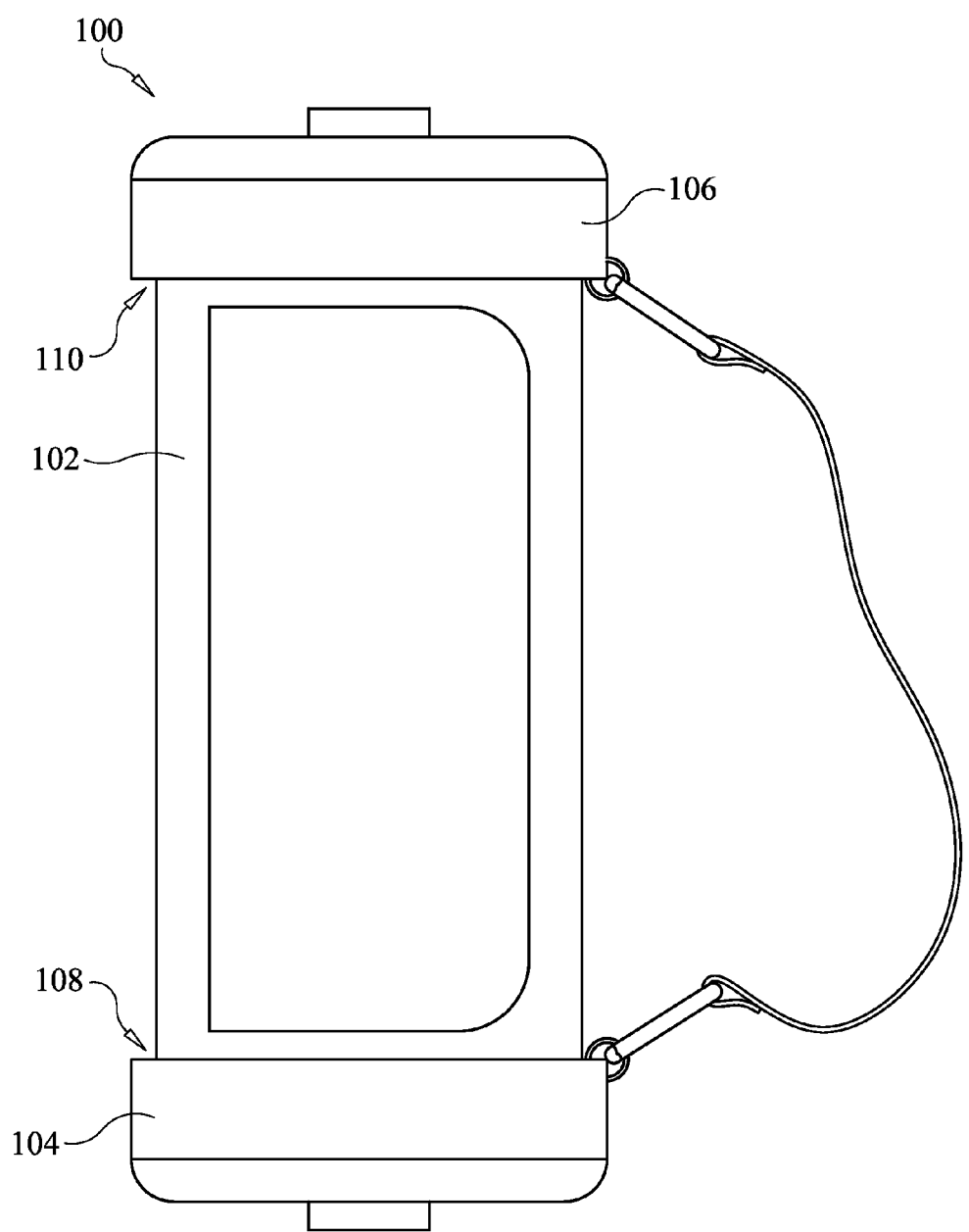
FIG. 1 is an elevational front view of a portable handheld container in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient portable and handheld container for storing personal devices. Embodiments of the invention provide a portable container providing the user with the ability to effectively propagate sound, and accurately and comfortably display media and visuals, generated from a mobile cellular phone securely retained inside the container to an ambient environment. In addition, embodiments of the invention also provide users with the ability to magnetically retain the container to a metallic structure, e.g., workout machine, so as to provide users line-of-sight and security of the container and to provide a full range of motion during an exercise or workout routine, or to effectively operate workout equipment, which safely helps the user maintain better balance, form, and focus.

Figure 2:
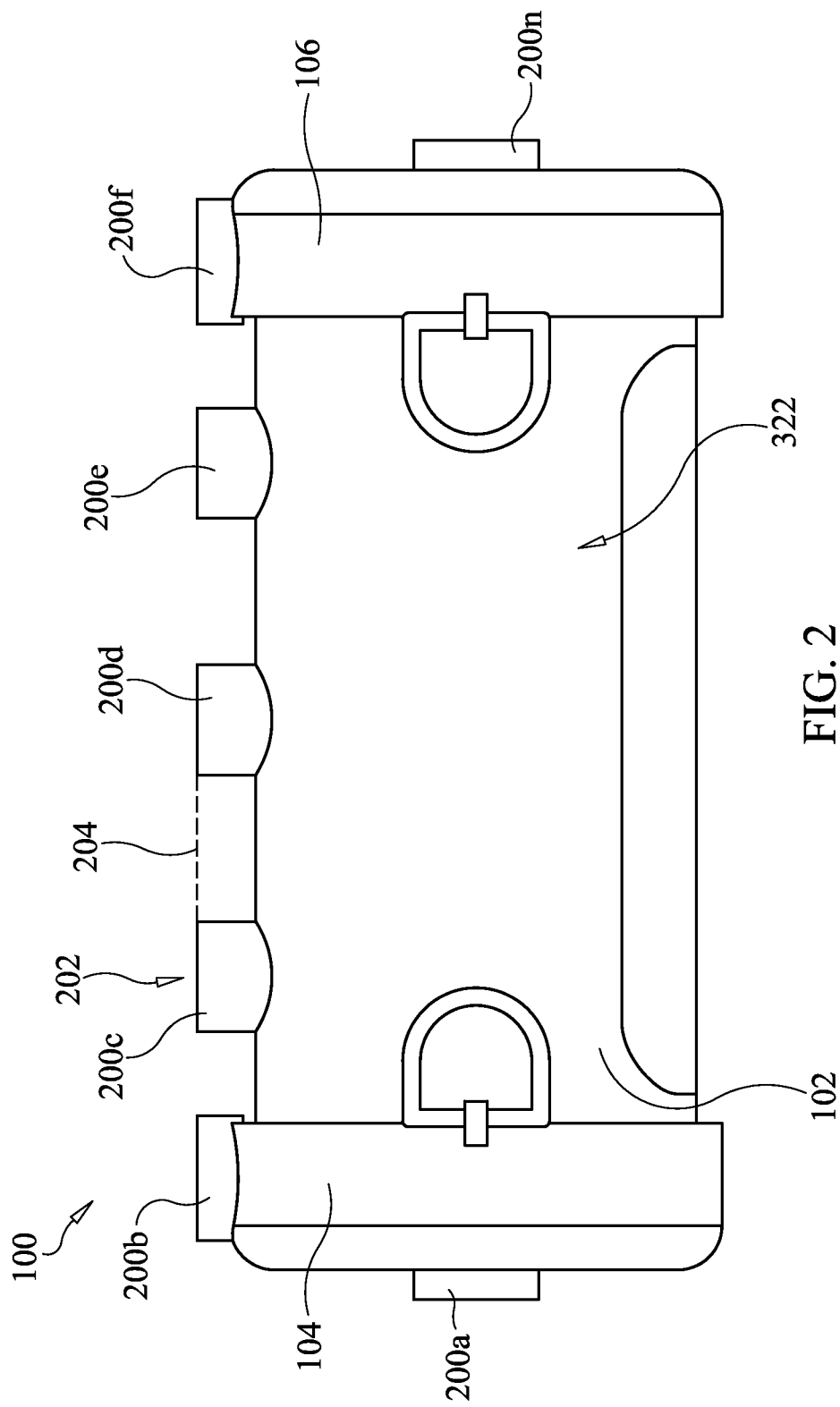
FIG. 2 is a fragmentary elevational side view of the container of FIG. 1, with the strap removed, in accordance with one embodiment of the present invention.
Figure 3:
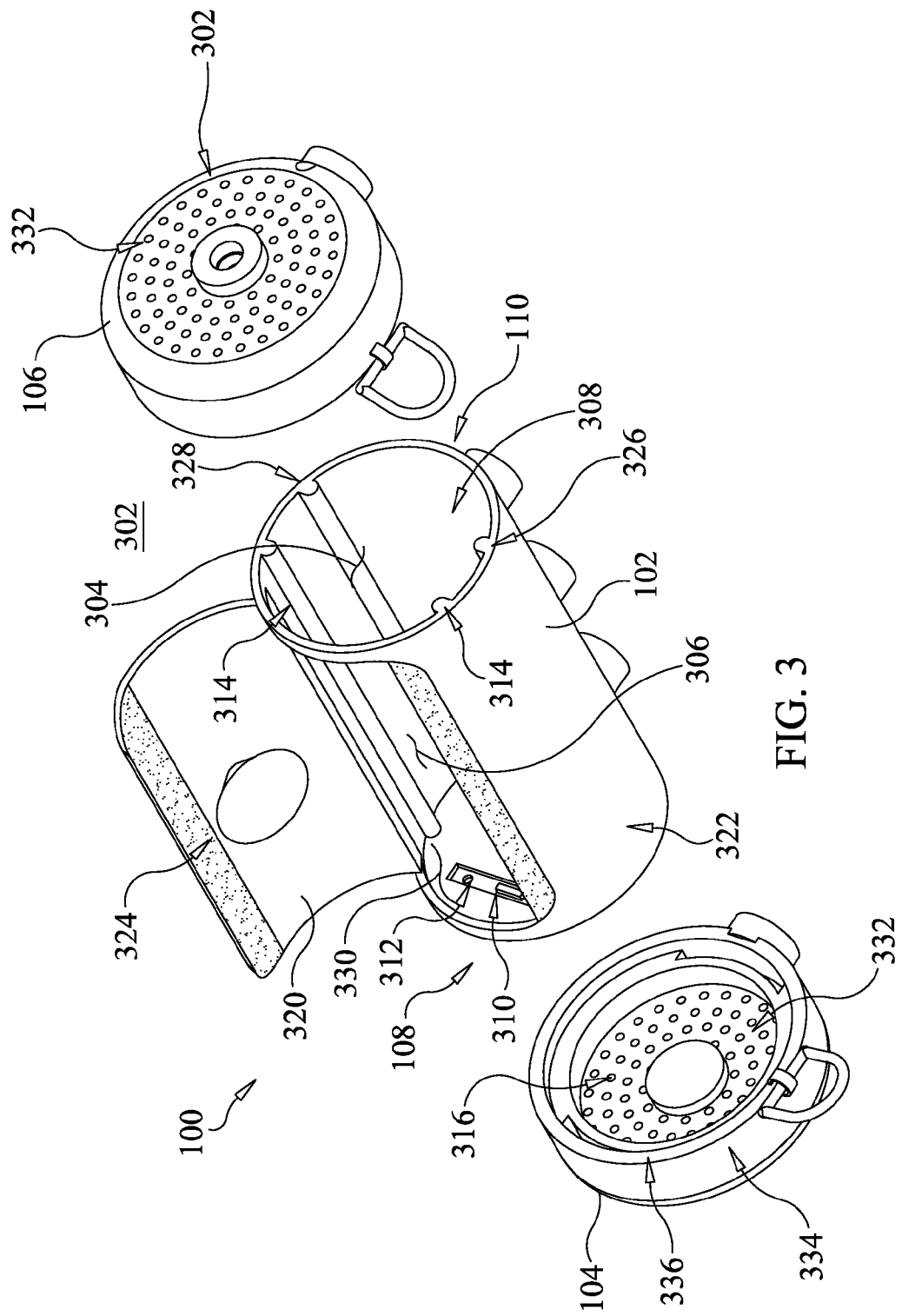
FIG. 3 is an exploded view of the container in FIG. 1.

Referring now to FIGS. 1-3, one embodiment of the present invention is shown. FIGS. 1-3 show several advantageous features of the present invention, but, as will be described below, the invention can be provided in several shapes, sizes, combinations of features and components, and varying numbers and functions of the components. The first example of a portable handheld container 100 includes a cylindrical sidewall 102, a first cover portion 104, a second cover portion 106, and one or more magnets 200*a-n* disposed on the cylindrical sidewall 102. The geometry of the container 100, in addition to a plurality of sound propagation apertures 300, produces a carrying container 100 that can effectively propagate sound waves generated from a mobile phone placed therein to an ambient environment 302. The container 100 also permits the user to stage visual entertainment and multimedia interaction between him or her and the mobile phone. The term "mobile phone" may be a cell phone, radio, or other portable audio-generating device.

The container 100 is portable and handheld in that it is capable of being easily carried or moved by user with his or her body, and without the use of machinery, equipment, or other external devices. The sidewall 102 can be seen of a cylindrical shape or a "cylinder-shaped" configuration such as a "right circular cylinder," an "elliptic cylinder," or another oblong geometric shape that facilitates the effective propagation of sound waves as described herein. The sidewall 102 can be seen with a first end 108 and a second end 110 defining a second opening 304. The first and second ends 108, 110 and cover portions 104,106 are shown located on exemplary sides of the container, but they may be inverted without deviating from the spirit and scope of the present invention. The second opening 304 advantageously provides users with access to store an audio generating device, e.g., a cell phone, and other personal items of the user within a cylindrical or "tube-shaped" storage area 306 defined by an inner surface 308 cylindrical sidewall 102. As shown in FIG. 1, the first and second cover portions 104, 106 can be seen coupled to the cylindrical sidewall 102. To provide access to the cylindrical storage area 306, the second cover portion 106 may be selectively removable to the second end 110. When the second cover portion 106 is coupled to the second end 110, the opening 304 is enclosed and access into the cylindrical storage area 306 is prevented. The cover portions 104,106 may also have one or more straps coupled to the sidewall 102 in order to retain the cover portions 104, 106 after removal.

In one embodiment of the present invention, the cover portions 104,106 are in the form of respective headphones, specifically circumaural headphones. The headphones may be coupled together with structure that may be used as a handle for the container 100. The headphones may be operably configured for detachment for listening, along with an audio jack coupled to the headphones, to the mobile device contained within the container 100. When detached from the body or sidewall 102 of the container 100, the ends of the sidewall 102 may also have surfaces that prevent objects retained therein from escaping.

Figure 4:
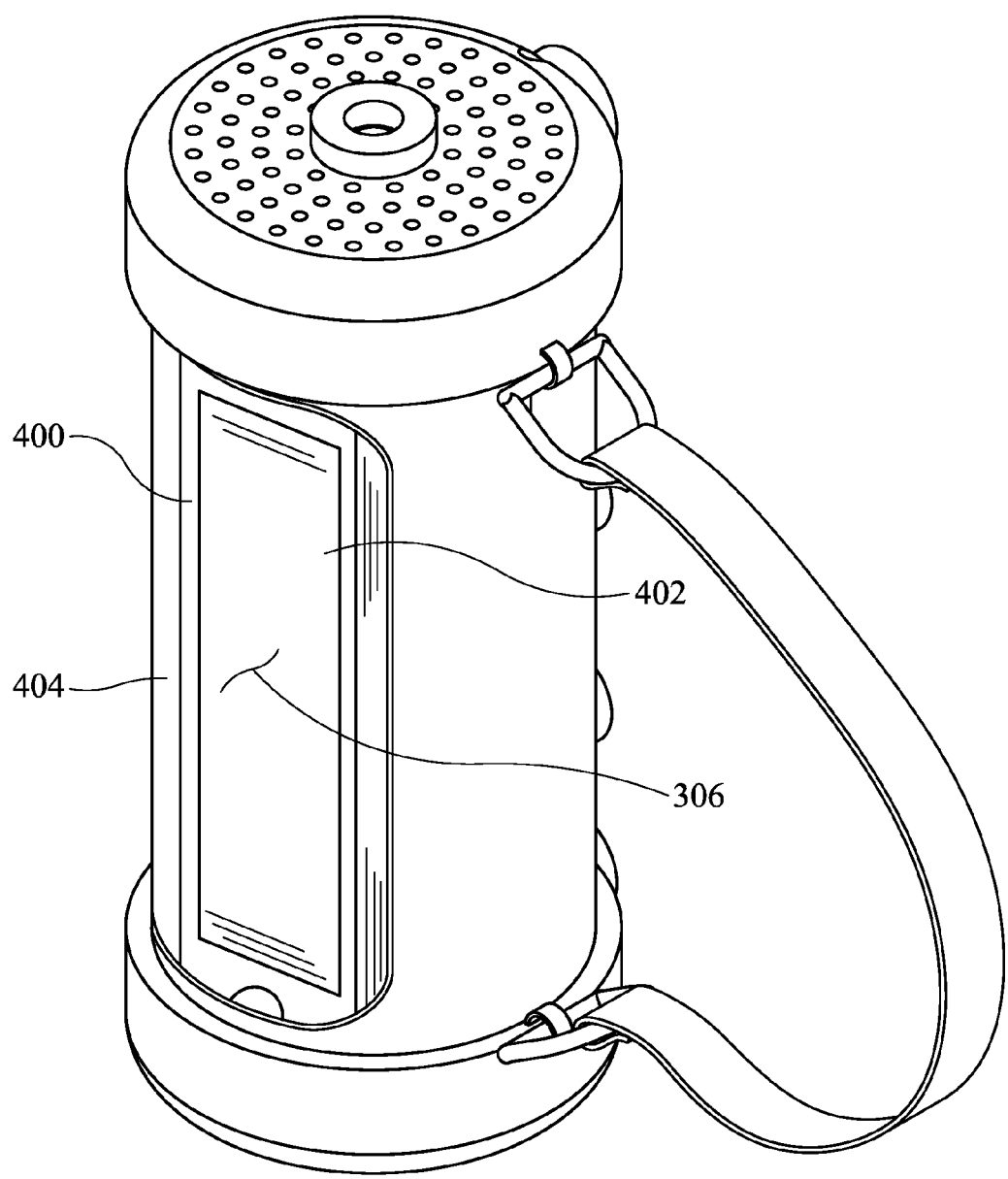
FIG. 4 is a perspective downward-looking view of the container of FIG. 1.

With reference now to FIGS. 3 and 4, the container 100 also includes an inner surface 310 defining a cell-phone track 312 sized and shaped to retain and orient a mobile phone 400 in a longitudinal direction of the cylindrical sidewall 102 within the cylindrical storage area 306. This advantageously permits the user to not only view and interact with a front surface 402 of the mobile phone 400 or other audio generating device, but also effectuates the propagation of sound waves through the plurality of apertures 300 defined by either or both of the first and second cover portions 104, 106. Said differently, because most mobile phones provide a built-in speaker at the lower end or upper end of the mobile phone, the orientation of the mobile phone 400 in the longitudinal direction of the container 100 as shown in FIGS. 3 and 4 produces a crisper and more amplified listening experience than those known containers operable to house mobile phones. In combination with an inner surface 308 of the sidewall 102 that is made of a material that inhibits sound wave attenuation generated by the mobile device 400, the container 100 provides a device operable to generate considerable better sound quality than those known containers. Further, because the mobile audio device 400 is able to be inserted and removed from the track 312, as opposed to those devices prohibiting the same, the container 100 provides more versatile and cost-effective approach to listing to audio at any location the user desires. The shape of the sidewall 102 also provides privacy to the user's mobile phone retained therein.

The cylindrical sidewall 102 may be of a rigid material such as carbon fiber, Kevlar, PVC, or other polymeric, metallic, or composite materials to provide impact and weather resistance and added security to the container 100. The covers 104, 106 may also be made of the same, similar, or different material as the sidewall 102. In one embodiment, the inner surface 308 is substantially smooth and substantially free (less than 1-2% of total surface area) of any apertures, excluding the tracks or walls 314 or sidewalls described herein, to effectively propagate the mobile-device generated sound waves through the apertures 300 to the ambient environment 302.

Figure 5:
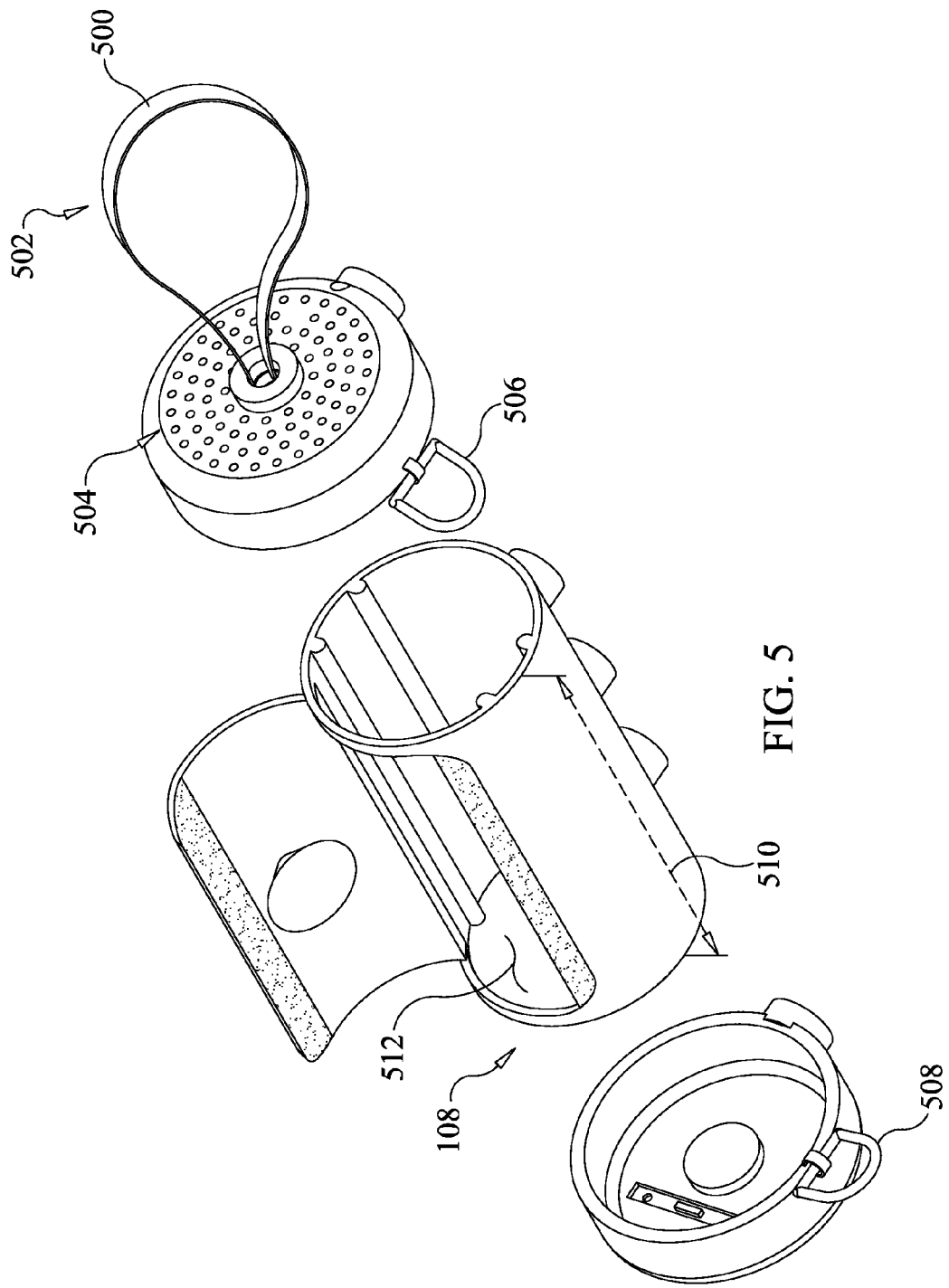
FIG. 5 is an exploded view of a portable handheld container in accordance with another embodiment of the present invention.

The track 312 or cell-phone track aperture 316 may be defined by an inner surface 310 defined by either the first and second cover portions 104, 106 (as shown in FIG. 5) so as to provide multiple openings, i.e., the second opening 304 and an opening 512 defined by the opposing end 108, for the user to place items into the cylindrical storage area 306. In other embodiments, as shown in FIG. 3, the track 312 may be defined by the inner surface 310 defined by the sidewall 102. When the track 312 is defined by the inner surface 310 disposed at the end 108 of the sidewall 102, the cell-phone track aperture 316 is disposed closest and proximal to the cover 104, 106 defining the plurality of sound propagation apertures 300. This is advantageous in that it disposes the apertures 3000 proximal to the built-in speakers of the mobile device 400 located either at the lower end or upper end of the mobile phone 400. The cell-phone track aperture 316 spans through the cover portion 104 and into the cell-phone track 312 when the cover portion 104 is attached thereto, and provides user access to an audio port of the mobile phone 400 retained within the cylindrical storage area 306.

When the track 312 is defined by the inner surface 310 disposed at the end 108 of the sidewall 102, one or both of the cover portions 104, 106 may be formed with a tongue-and-groove system 336 that ensures that when the cover portion 104 is coupled and locked to either end 108, 110 of the sidewall 102, the cell-phone track aperture 316 and an aperture, e.g., aperture 318, defined by the track 312 are aligned to permit effective entrance and egress of an audio jack, power cord, or other cord or connection device available for insertion into a mobile phone 400.

In one embodiment, the track 312 is sized and shaped to retain the mobile phone 400 in a longitudinal direction by providing a recess and walls contouring the dimensions of various mobile phone bodies or mobile-phone cover bodies. For example, for a mobile phone having a thickness of 0.27" and a width of 2.64", the track 312 will have a recess of a depth of approximately 0.2"-1", a width of approximately 2.65-2.66", and a thickness of approximately 0.28-30". Deviations outside of said ranges are possible as long as the track 312 facilitates in maintaining the longitudinal orientation of the mobile phone to ensure increased sound quality and user-visibility of the mobile phone 400 through the window 404 or door 320. Said another way, the cell phone track 312 can be seen disposed within the cylindrical storage area 306, adjacent to the sidewall opening 330, and operably configured to engage opposing longitudinal edges of a mobile phone 400 smart phone and frictionally retain the same within the cell phone track 312.

To provide user access to the cylindrical storage area 306, the container 100 may include a door 320, with a transparent window 404, pivotally coupled to the cylindrical sidewall 102. In other embodiments, there is no door 320 and the transparent window 404 is disposed on the cylindrical sidewall 102, and configured to permit user-visibility of the front surface 402 of the mobile phone 400 retained within the cylindrical storage area 306. In further embodiments, there is no window 404, as shown in FIG. 3, and the door 320 may include a suction cup or other fasteners to facilitate in stabilizing the mobile phone 400 retained within the cylindrical storage area 306. The window 404 may be of a polymeric material, such as PVC, acrylic, or other material, which may advantageously be flexible to permit user manipulation of the front surface 402 of the mobile phone 400 from outside the container 100.

In FIG. 3, the door 320 can be seen forming the same shape or arc corresponding to the shape of the sidewall 102 and also includes an open position along a door translation path at least 70° displaced from an outer surface 322 of the cylindrical sidewall 102 to permit user access to the cylindrical storage area 306, through the sidewall opening 330, and access to a mobile phone retained therein. In one embodiment, the door 320 is placed in the open position by rotating the door 320 from the outer surface 322. In other embodiments, the door 320 may be translated in a linear direction. The door 320 may be placed in a closed position (as shown in FIG. 4) by enclosing the cylindrical storage area 306 and attaching the door 320 to the cylindrical sidewall 102 via a hook-and-loop fastener 324, e.g., Velcro. In one embodiment, the Velcro will only be in one location on the door 320, but in other embodiments the Velcro will span around the perimeter of the door 320 to provide a more effective seal. In other embodiments, the door 320 may couple and decouple with the sidewall 102 using a zipper. As will be appreciated by those of skill in the art, the door 320 may be pivotally coupled to the sidewall 102 with a hinge created by the material of the sidewall 102 or a separate hinge structure.

As the door 320 is operable to be pivoted, in some embodiments of the present invention, it contains a keyboard coupled thereto. The keyboard will be operable to be communicatively coupled to the mobile phone 400 housed within the container 100. Therefore, the container 100 may be used in a fashion similar to a desktop computer or tablet, while having the safety and security associated with the mobile phone 400.

Figure 6:
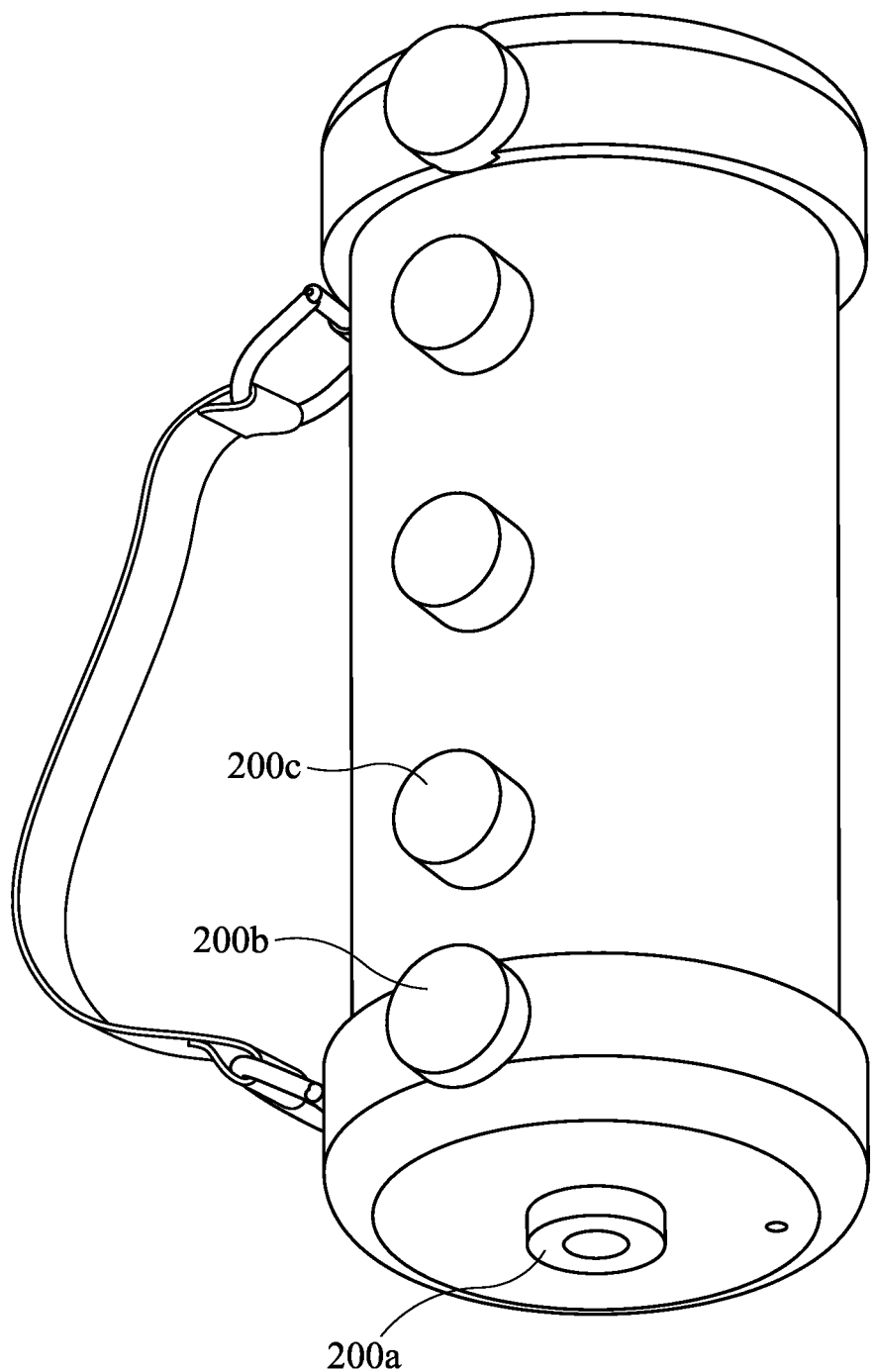
FIG. 6 is a perspective downward-looking view of the container of FIG. 1.
Figure 7:
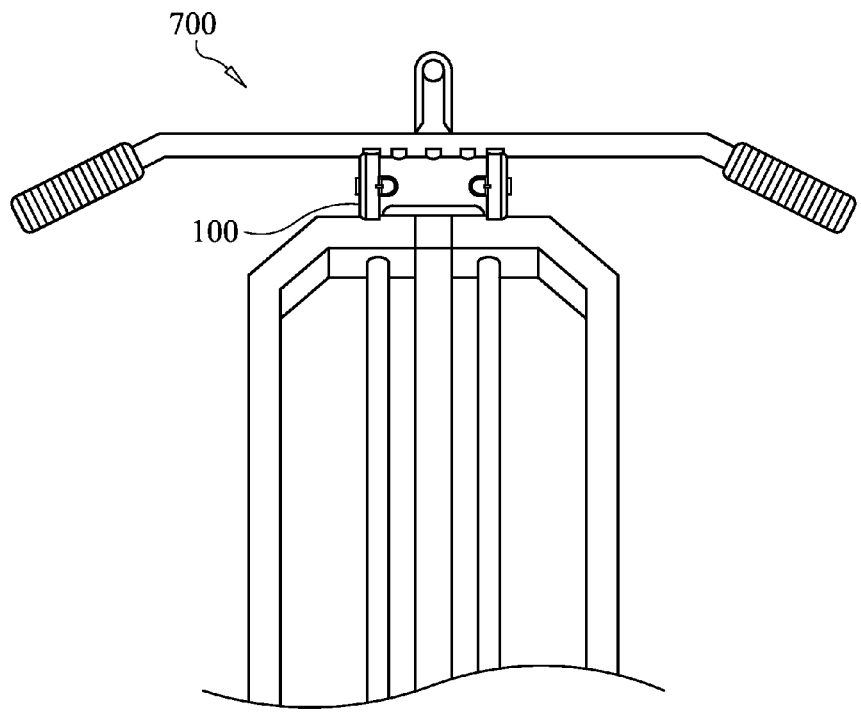
FIG. 7 is a perspective upward-looking view of the container of FIG. 1 magnetically coupled to a metallic piece of workout equipment in accordance with one embodiment of the present invention.

With reference to FIGS. 2, 6, and 7, another important feature of the present invention is illustrated. More specifically, the container 100 can be seen having one or more magnets 200a-n disposed on either or all of the cylindrical sidewall 102 or the first and/or second cover portions 104, 106. Beneficially, the one or more magnets 200a-n are operably configured to produce a magnetic field sufficient to retain, without any external non-magnetic support forces, a combined weight of the container 100 that is defined by the cylindrical sidewall 102 and the first and second cover portions 104, 106 to a metallic structure, e.g., an exercise device 700. Said another way, the container 100 includes one or more strategically placed magnets 200a-n producing a sufficient magnetic field to retain slightly more than the weight of the container 100. For example, in one embodiment the cylindrical sidewall 102 and cover portions 104, 106 are approximately 3 lbs (i.e., the "container weight"), so one or more magnets, e.g., magnets 200b-c, are of a N45 Grade, a thickness of 1.125", and a diameter of 0.5", so as to produce approximately 17 lbf of pull force or approximately 6,680 gauss. Said differently, the magnets 200b-c each generates enough magnetic fields so as to exceed the weight of the container 100 by at least 10%. In other embodiments, as described above, the magnets 200a-n will generate well above the container weight, but not too much force so as to prevent a user from removing the container 100 from the metallic structure 700 or that would interfere with radio frequency waves received by the mobile device 400.

In one embodiment, the container 100 may include a plurality of magnets 200a-n disposed on the outer surface 322 of the cylindrical sidewall 102, with the magnets, e.g., magnets 200c-d, each having an outer surface 202 substantially coplanar, i.e., within +/−3° variance, with one another (represented with line 204). In preferred embodiments, the coplanar magnets 200b-c project outwardly from the outer surface 322 of the sidewall 102 so that no other portions of the container 100 interfere with the coupling of the container 100 to the metallic structure 700. This beneficially allows users to attach the container 100 to a metallic structure 700 while he or she is working out or involved in an exercise, while being able to readily observe the container 100 and the display of the mobile phone 400 housed therein. The magnets 200a-n also enable a user to place the container 100 in a closer proximity to the user, thereby providing the user with better sound quality of the audio generated within the container 100 and added security and peace of mind while working out. In one example shown in FIG. 7, the container 100 is coupled, through the magnets 200a-n, on an outer surface of a metallic portion of a piece of exercise equipment 700, e.g., a pull-down bar.

With reference to FIG. 3, the cylindrical sidewall 102 can be seen having a plurality of walls 314 disposed on two opposing sides, e.g., sides 326, 328, of the inner surface 308 of the cylindrical sidewall 102. The plurality of walls 314 span, in parallel to one another, from the second end 110 of the cylindrical sidewall 102 toward the first end 108 of the cylindrical sidewall 102. The plurality of walls 314 or "divider walls" may serve two important purposes. First, they may be placed to navigate or guide the mobile phone from one of the openings, e.g., opening 304, defined by the sidewall 102 to the cell-phone track 312. Second, they may be utilized to retain and guide a removably insertable divider (not shown). The divider is shaped and sized to be received within the recess defined by the walls 314 and is utilized to segment the cylindrical storage area into independent, i.e., not sharing common space, compartments, or a first and second storage area, wherein the mobile phone 400 may be securely retained on one side and the other side can be used to store and retain other personal items of the user, e.g., keys, wallet, etc.

In order to effectively remove and receive a user's personal items, the container 100 may utilize a variety of entrance apertures. As discussed above, the container 100 may include a sidewall opening 330 defined by the sidewall 102, or one or more openings defined by the ends 108, 110, or circumferential edges, of the sidewall 102. When the openings are formed by the ends 108, 110, the cover portions 104, 106 may include a circular surface 332 sized to cover the openings and a circumferential lip 334 extending substantially perpendicular to the flat circular surface 332 shaped and sized to frictionally secure the cover portions 104, 106 to the respective ends 108, 110 of the rigid cylindrical sidewall 102. The term "rigid" is defined as being substantially inflexible or unable to change shape upon exposure to external forces less than approximately 15-20 lbf.

With reference now to FIG. 5, the container 100 may also utilize a retractable strap 500 embedded or bonded within either or both of the first and second cover portions 104, 106. The retractable strap has a free end 502 disposed, in a retracted position along a strap translation path, proximal to the outer surface 504 of the first and second cover portions 104, 106. The strap 500 may be extended and retracted using a spring-loaded reel or other comparable device. The length of the strap 500 may be approximately 1-2' in one embodiment, but may be outside of said range in other embodiments. The strap 500 may be a fabric material and may also form a handle at the free end 502 for ease of handling and storage. The retractable strap 500 provides another means for the container 100 to be stored and carried without inhibiting the movement or activity of the user.

The container 100 can also be seen defining two loops 506, 508 for fastening additional straps and may also include one or more recessed and/or textured areas on the outer surface 322 of the sidewall 102 to provide a gripping surface or gripping area for the user. In one embodiment, the sidewall 102 is rigid such that the gripping areas are shaped to be gripped within a palm of a user's hand without collapsing the cylinder-shaped sidewall 102. In one embodiment, the container 100 has a sidewall length 510 of approximately 6-18", an outer diameter of approximately 5-8", and a wall thickness of approximately 0.25-0.75". In other embodiments, said dimensions may vary outside of said ranges.

Figure 8:
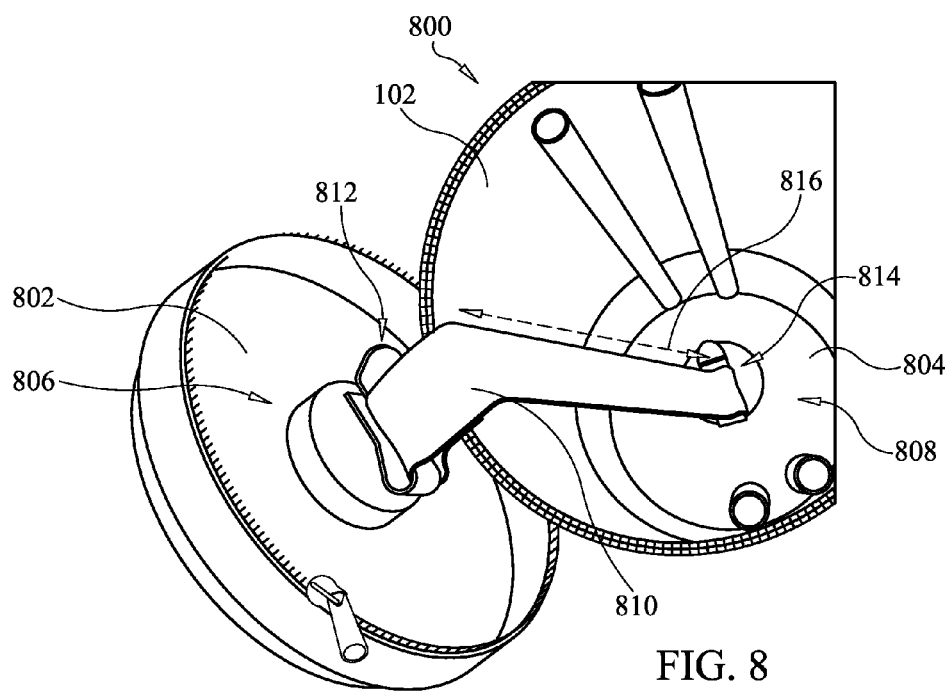
FIG. 8 is a perspective downward-looking view of a portable container having an elastic couple coupled to each cover portion of the container in accordance with one embodiment of the present invention.

With reference now to FIG. 8, another embodiment of the container 800 can be seen. More specifically, the container 800 can be seen with two cover portions 802, 804 having inner surfaces 806, 808, respectively, coupled together through an elastic couple 810. The elastic couple 810 may be a cord or strap of a polymeric material such as rubber and can be seen with a first end 812 and a second end 814 coupled to the inner surfaces 806, 808, respectively. In one embodiment, the first and second ends 812, 814 of the couple 810 may have loops removably attached to a fastener attached to the inner surfaces 806, 808. In other embodiments, the first and second ends 812, 814 of the couple 810 may be attached to the inner surfaces 806, 808 with adhesive.

The elastic couple 810 advantageously has, in a static position along an elastic couple translation path, an elastic couple length (represented with arrow 816) separating the first and second ends 812, 814 of the elastic couple 810 that is less than a sidewall length 510 separating the first and second ends of the sidewall. FIG. 8 depicts the couple 810 in a dynamic position along the elastic couple translation path. Said another way, when the elastic couple is stretched it is placed in a dynamical position and its movement toward the dynamic position is the couple translation path. When the elastic couple 810 is not subject to an external force, it is in its static position. Said another way, the static position of the couple 810 is when it is not stretched.

In one example, the couple length 816, in its static position, is approximately 4", while the sidewall length 510 is approximately 8". In other embodiments, the various ranges of the couple length 816, in its static position, and the sidewall length 510 are outside of said ranges. As such, the user can remove one or more of the cover portions 802, 804 to access the storage area with minimal risk of the cover portions 802, 804 becoming damaged by mishandling or being dropped. Furthermore, the couple 810 also ensures the cover portions 802, 804 have a tight fit when coupled to the sidewall 102. This becomes increasingly important when mobile phones and other personal items, which are prone to being damaged if dropped, are placed within the storage area.

The container 800 may also come with a zipper assembly 818, 820 coupled to both one or more of the cover portions 802, 804. The zipper assemblies 818, 820 also further inhibits one or more of the cover portions 802, 804 from being dislodged or decoupled from the sidewall 102 when the container 800 is in use. Again, when mobile phones and other personal items are placed within the storage area of the container 800, this becomes important.

A portable handheld container has been disclosed that includes providing the user the ability to magnetically retain the container to a metallic structure, e.g., workout machine, so as to provide users full range of motion during an exercise or workout routine, or to effectively operate workout equipment. The container also enables the user provide for organization of his or her personal items, gym floor safety, and security. The container also provides a user with the ability to effectively propagate sound generated from a mobile phone securely retained inside the container.

What is claimed is:

1. A portable handheld container for storing and securing personal items, the container comprising:
   a cylindrical sidewall having:
      a first end;
      a second end defining a second opening, the second end opposite the first end of the cylindrical sidewall; and
      an inner surface defining a cylindrical storage area separating the first end and the second end of the cylindrical sidewall;
   a first cover portion coupled to the first end;
   a second cover portion selectively removably coupled to the second end so as to enclose the second opening into the cylindrical storage area, at least one of the first and second cover portions defining a plurality of sound propagation apertures; and
   an inner surface defining a cell-phone track sized and shaped to retain and orient a mobile phone in a longitudinal direction of the cylindrical sidewall within the cylindrical storage area.

2. The portable handheld container according to claim 1, further comprising:
   at least one cell-phone track aperture defined by at least one of the first and second cover portions, the at least one cell-phone track aperture disposed proximal to the at least one of the first and second cover portions defining the plurality of sound propagation apertures and spanning into the cell-phone track for providing user access to an audio port of the mobile phone retained within the cylindrical storage area.

3. The portable handheld container according to claim 1, further comprising:
   a door pivotally coupled to the cylindrical sidewall and having an open position along a door translation path at least approximately 70° displaced from an outer surface of the cylindrical sidewall and a closed position with the door attached to the cylindrical sidewall with a hook-and-loop fastener.

4. The portable handheld container according to claim 1, further comprising:
   a transparent window disposed on the cylindrical sidewall and configured to permit user-visibility of a front surface of the mobile phone retained within the cylindrical storage area.

5. The portable handheld container according to claim 1, further comprising:
   at least one magnet disposed on at least one of the cylindrical sidewall and the first and second cover portions, the at least one magnet operably configured to produce a magnetic field sufficient to retain, without any external non-magnetic support forces, at least approximately 10% more than a combined weight of the container, defined by the cylindrical sidewall and the first and second cover portions, to a metallic structure.

6. The portable handheld container according to claim 1, further comprising:
   a plurality of magnets disposed on an outer surface of the cylindrical sidewall, the plurality of magnets operably configured to produce a magnetic field sufficient to retain, without any external non-magnetic support forces, at least approximately 10% more than a combined weight of the container, defined by the cylindrical sidewall and the first and second cover portions, to a metallic structure, wherein the plurality of magnets each have an outer surface coplanar with one another.

7. The portable handheld container according to claim 1, wherein the cylindrical sidewall further comprising:
   a plurality of walls disposed on two opposing sides of the inner surface of the cylindrical sidewall, the plurality of walls spanning, in parallel to one another, from the second end of the cylindrical sidewall toward the first end of the cylindrical sidewall.

8. The portable handheld container according to claim 1, wherein:
   the first end of the cylindrical sidewall defines a first opening, the first cover portion coupled to the first end so as to enclose the first opening into the cylindrical storage area and including the inner surface defining the cell-phone track.

9. A portable handheld container for storing and securing personal items, the container comprising:
   a rigid sidewall:
      with a first end defining a first opening;
      with a second end defining a second opening, the second end opposite the first end of the rigid sidewall; and
      defining a storage area separating the first end and the second end of the sidewall;
   a first cover portion selectively removably coupled to the first end so as to enclose the first opening into the storage area;
   a second cover portion selectively removably coupled to the second end so as to enclose the second opening into the storage area, the rigid sidewall and first and second cover portions defining a container weight; and
   at least one magnet disposed on at least one of the sidewall and the first and second cover portions, the at least one magnet operably configured to produce a magnetic field sufficient to retain, without any external non-magnetic support forces, at least 10% more than the container weight to a metallic structure.

10. The portable handheld container in accordance with claim 9, wherein the rigid sidewall and the storage area are both of a cylindrical shape and further comprising:
    a door pivotally coupled to the cylindrical sidewall, the door having an open position and a closed position, the cylindrical sidewall defining a sidewall opening into the cylindrical storage area in the open position and the sidewall opening being covered by the door in the closed position.

11. The portable handheld container in accordance with claim 10, further comprising:
    a cell phone track disposed within the cylindrical storage area, adjacent to the sidewall opening, and operably configured to engage opposing longitudinal edges of a mobile phone and frictionally retain the mobile phone within the cell phone track.

12. The portable handheld container in accordance with claim 10, further comprising:
    a plurality of divider walls disposed within the cylindrical storage area and extending along a longitudinal length of the cylindrical storage area, the divider wall segmenting the cylindrical storage area into a first storage area and second storage area.

13. The portable handheld container in accordance with claim 9, wherein:
the rigid sidewall and the storage area are both of a cylindrical shape, the rigid sidewall of at least one of a carbon fiber material and a vinyl material.

14. The portable handheld container in accordance with claim 9, further comprising:
an inner cover surface defined by the first cover portion;
an inner cover surface defined by the second cover portion; and
an elastic couple with a first end coupled to the inner cover surface defined by the first cover portion, a second end coupled to the inner cover surface defined by the second cover portion, and, in a static position along an elastic couple translation path, an elastic couple length separating the first and second ends of the elastic couple, the elastic couple length less than a sidewall length separating the first and second ends of the rigid sidewall.

15. The portable handheld container in accordance with claim 9, further comprising:
a retractable strap embedded within at least one of the first and second cover portions, the retractable strap having a free end disposed, in a retracted position along a strap translation path, proximal to the outer surface of the at least one of the first and second cover portions.

16. A storage container for storing personal items, the storage container comprising:
a cylinder-shaped sidewall:
including a first end;
including a second end, opposite the first end;
defining a tubular-shaped storage area between the first end and the second end; and
including a door portion operably configured to pivot between an open position and a closed position, the cylinder-shaped sidewall defining a sidewall opening into the tubular-shaped storage area in the open position and the sidewall opening being covered by the door portion in the closed position;
a first cover portion coupled to the first end so as to enclose a first opening into the tubular-shaped storage area defined by a circumferential edge of the first end; and
a second cover portion coupled to the second end so as to selectively enclose a second opening into the tubular-shaped storage area defined by a circumferential edge of the second end; and
at least one magnet provided on the cylinder shaped sidewall, the at least one magnet operably configured to magnetically retain the portable handheld container to a metal surface.

17. The storage container in accordance with claim 16, further comprising:
a retractable strap embedded within at least one of the first and second cover portions, the retractable strap having a free end disposed, in a retracted position along a strap translation path, proximal to the outer surface of the at least one of the first and second cover portions.

18. The storage container in accordance with claim 16, wherein:
the cylinder-shaped sidewall defines a gripping surface extending from the first end to the second end and shaped to be gripped within a palm of a user's hand against the gripping surface without collapsing the cylinder-shaped sidewall.

19. The storage container in accordance with claim 16, further comprising:
a plurality of divider walls disposed within the tubular-shaped storage area and extending along a longitudinal length of the tubular-shaped storage area; and
a divider interposed between the plurality of divider walls to segment the tubular-shaped storage area into a first storage area and second, independent, storage area.

* * * * *